Aug. 21, 1956 E. J. REA 2,759,235
HOOK FOR BINDER CHAINS
Filed May 21, 1953
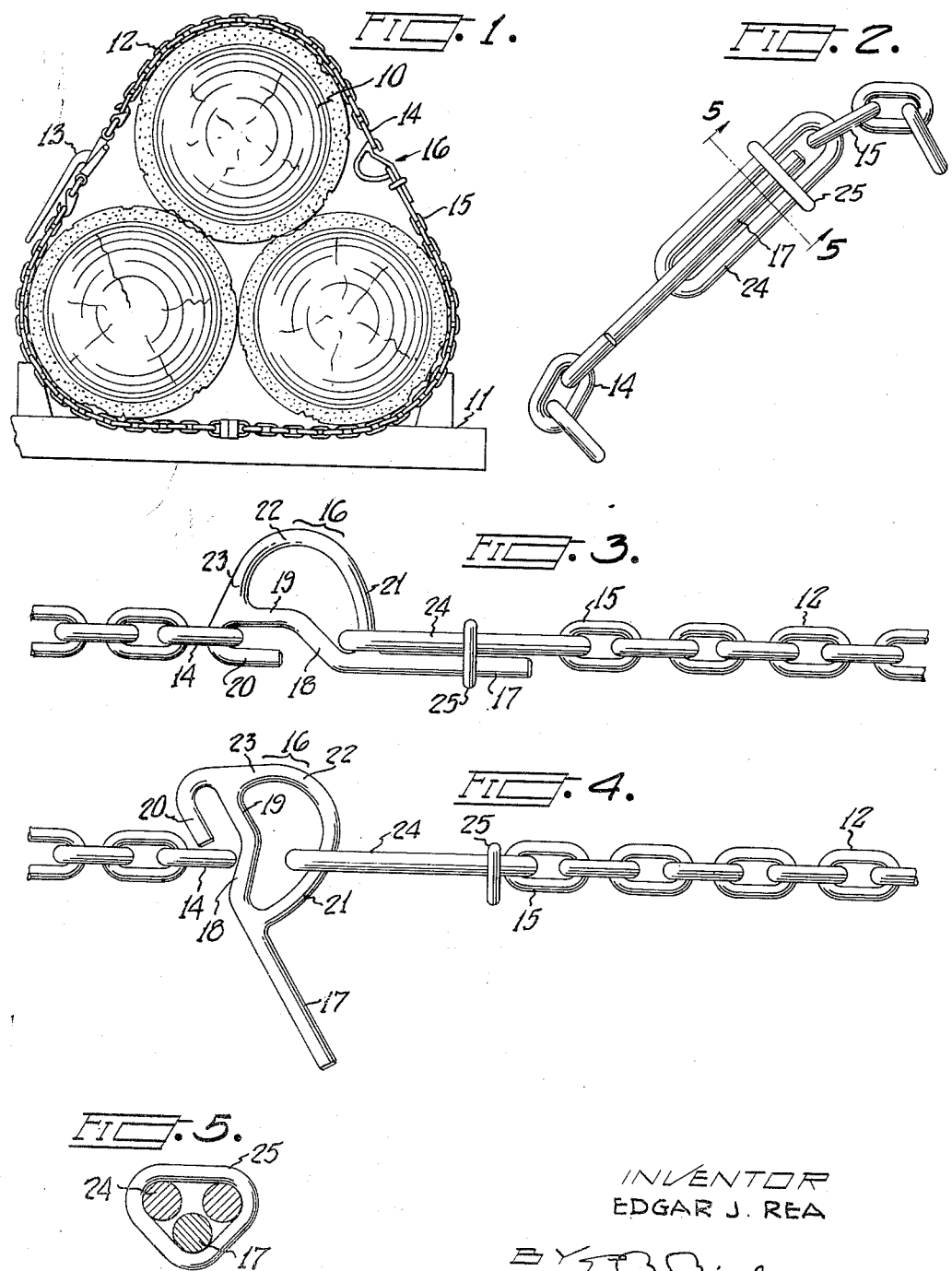
INVENTOR
EDGAR J. REA
ATTORNEY

# United States Patent Office 2,759,235
Patented Aug. 21, 1956

2,759,235

HOOK FOR BINDER CHAINS

Edgar J. Rea, Rainier, Oreg.

Application May 21, 1953, Serial No. 356,478

4 Claims. (Cl. 24—230.5)

This invention relates generally to log transporting equipment and particularly to a hook for binder chains.

The main object of this invention is to provide a quick acting and positive means for uniting the ends of a chain, which has been passed around a load of logs.

The second object is to so construct the hook that a relatively slight release of the tightening element will permit the manual release of the chain fastening hook.

I accomplish these and other objects in the manner set forth in the following specification as illustrated in the accompanying drawing, in which Fig. 1 is an end elevation of a load of logs, showing a binder chain passed around the logs and with the hook in a holding position.

Fig. 2 is a fragmentary view of the device at a larger scale, showing a keeper in position on the binder hook.

Fig. 3 is a fragmentary plan of the hook and adjoining chain parts, showing a straight line pull through the hook.

Fig. 4 is a view similar to Fig. 3 but showing the hook being released.

Fig. 5 is a transverse section taken along the line 5—5 in Fig. 2.

Like numbers of reference refer to the same or similar parts throughout the several views.

Referring in detail to the drawing there is shown, merely by way of illustration, a load of three logs 10 mounted on a bunk 11 such as are findable on any log conveying truck or trailer. In this case only three logs are shown of equal dimension and in which a binder chain would not be needed except that it is required by law. The value of the hook for binder chains lies in its adaptability to logs of unequal diameter and relative positions, and in the ease with which it can be applied or removed with the minimum loss of time or expenditure of effort.

There is also indicated a binder chain 12 in which is inserted any of the common forms of chain tighteners 13, by means of which the chain 12 is clamped down on the logs 10 to keep them from moving about on the bunks 11 or in relation to each other.

Owing to the fact that log loads are often moved over rough terrain and at high speed, a load which may be tight at the loading point may create slack in the binding chains after a long hard ride. In such cases the conventional hooks are apt to become disengaged and an entire chain or chains 12 be released. To avoid awkward and cumbersome hooks, which are not dependable, I have produced a hook which occupies a single plane and is used to unite the end links 14 and 15 together. The hook 16 has a straight side handle portion 17 which constitutes a little more than one-half of the length of the binder hook 16.

At one end of the handle portion 17 is an angular offset 18 which joins a hook shank 19 whose chain hook 20 is parallel with the portion 19 and co-axial with the handle 17. Merging with the handle 17 is an arcuate arm 21 whose center is in the center of the hook 20. The arm 21 turns with a shorter radius curve 22 into the tangent side 23 which terminates at the end of the hook 20.

Within the somewhat irregular ring formed by the portions 18, 19, 21, 22 and 23 is a long link 24 whose opposite end is connected to the chain link 15. A triangular keeper 25 is slidably mounted on the link 24 and can include the handle 17, as shown in Fig. 3. In practice, it is preferable to turn the hook opposite the position shown in Fig. 1 in order that gravity will hold the keeper in place if the chain should loosen.

As thus described and illustrated in the drawing, it will be observed that the parts 19 and 20 are connected by a bight portion to form two legs of a U-shaped hook wherein leg or shank 19 has a portion 18 angularly offset toward the leg 20 beyond the end of leg 20. This offset provides space on the arcuate portion of arm 21 for link 24 disposed in a plane through the bight portion of the hook between the legs of the hook when the chains are tensioned as shown in Fig. 3.

In the operation of the device, the chain 12 is placed around the logs 10 and the hook 20 made to engage the nearest link 14, as shown in Fig. 4, after which the handle 17 is moved to the position shown in Fig. 3, in which it will be noted that the link 24 has been riding on the arc of the arm 21 until the chain and contact point of the link 24 and arm 21 and the chain 12 assume a straight line position as in Fig. 3. After this the usual tightener is used to put the required amount of tension in the chain.

I claim:

1. A connector for binder chains comprised of an elongated handle having one end offset and parallel with said handle, a chain hook on said offset end having an arcuate wall portion, the end of said hook being co-axial with said handle, an arcuate arm having one end joined wth said handle and having the same center of curvature as the arcuate wall portion of said hook, said arm being turned at its other end to join the end of said hook, an elongated link connected to said arm, said link being joined to the binder chain at one end, said chain hook being connected to the binder chain, and a keeper on said elongated link adapted to receive the end of said handle.

2. A connector for binder chains comprised of an elongated straight handle having an offset chain hook at one end, said chain hook having an arcuate wall portion, an arm formed around the offset side of said chain hook, and a long link connected to said arm, said arm being characterized by having an arcuate portion whose center of curvature is common to the center of curvature of the wall portion of said chain hook, and a keeper for said handle on said long link.

3. A connector for binder chains adapted to unite two chain ends together, comprised of an arcuate arm having a handle along one side thereof and an offset chain hook forming an extension of said handle, said hook having an arcuate wall portion with a center of curvature common to said arcuate arm, and a long link joined to said arcuate arm having a keeper for holding said handle parallel with said link while the line of pull forms a straight line passing through said chain and said long link and through the center of the chain hook.

4. A connector for a pair of binder chains comprising a U-shaped hook adapted to engage and disengage one of the chains, said hook comprising two legs connected by a bight portion, one of said legs having a free end over which said one chain may be passed for engagement and disengagement and said other leg having a portion angularly offset toward said one leg beyond said end of said one leg, a curved arm having ends joining said other leg at said offset portion and adjacent said bight portion of the hook, said arm and said other leg forming a closed ring for receiving a link of the other chain, a substantial portion of the length of said arm from said offset leg portion being curved on a circular arc having a center of curvature at said bight of the hook, said offset leg portion providing space on said arcuate portion of said arm for said link disposed in a plane through said bight portion of the hook and between the legs of the hook, and an elongated handle on said other leg of said hook for rotating the connector about said bight portion of the hook.

References Cited in the file of this patent

UNITED STATES PATENTS

| | | |
|---|---|---|
| 558,006 | Vannote | Apr. 7, 1896 |
| 2,228,399 | Ostman | Jan. 14, 1941 |
| 2,522,150 | Weber | Sept. 12, 1950 |